(12) United States Patent
Fei et al.

(10) Patent No.: US 12,228,028 B2
(45) Date of Patent: Feb. 18, 2025

(54) SYSTEMS AND METHODS FOR GENERATING DEPTH UNCERTAINTY VALUES AS A FUNCTION OF POSITION IN A SUBSURFACE VOLUME OF INTEREST

(71) Applicant: CHEVRON U.S.A. INC., San Ramon, CA (US)

(72) Inventors: Weihong Fei, Sugarland, TX (US); Chaoshun Hu, Houston, TX (US); Paige Rene Given, Houston, TX (US); Gilles Hennenfent, Covington, LA (US); Cory Hoelting, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 246 days.

(21) Appl. No.: 17/394,808

(22) Filed: Aug. 5, 2021

(65) Prior Publication Data
US 2023/0042577 A1    Feb. 9, 2023

(51) Int. Cl.
| | | |
|---|---|---|
| *G01V 1/28* | (2006.01) | |
| *E21B 47/04* | (2012.01) | |
| *G01V 1/34* | (2006.01) | |
| *G06N 20/00* | (2019.01) | |

(52) U.S. Cl.
CPC .............. *E21B 47/04* (2013.01); *G01V 1/345* (2013.01); *G06N 20/00* (2019.01); *E21B 2200/22* (2020.05); *G01V 2210/74* (2013.01)

(58) Field of Classification Search
CPC ..... E21B 47/04; E21B 2200/22; G06N 20/00; G01V 1/345; G01V 2210/74
See application file for complete search history.

(56) References Cited

U.S. PATENT DOCUMENTS

| | | | | |
|---|---|---|---|---|
| 2009/0164125 A1* | 6/2009 | Bordakov | ............... | E21B 47/04 |
| | | | | 702/6 |
| 2010/0185396 A1* | 7/2010 | Docherty | ............... | G01V 1/345 |
| | | | | 702/14 |
| 2013/0046476 A1* | 2/2013 | Schultz | .................. | G01V 1/305 |
| | | | | 702/18 |
| 2021/0041596 A1 | 2/2021 | Kushwaha et al. | | |
| 2021/0247537 A1* | 8/2021 | Zhu | ........................ | E21B 47/005 |
| 2023/0003118 A1* | 1/2023 | AlTammar | ............... | E21B 47/04 |

OTHER PUBLICATIONS

International Search Report and Written Opinion mailed Nov. 9, 2022 for International Application No. PCT/US2022/039262, filed Aug. 3, 2022.

\* cited by examiner

*Primary Examiner* — Mohamed Charioui
*Assistant Examiner* — Christine Y Liao
(74) *Attorney, Agent, or Firm* — Sheppard, Mullin, Richter & Hampton LLP

(57) ABSTRACT

Systems and methods for estimating reservoir productivity as a function of position in a subsurface volume of interest are disclosed. Exemplary implementations may: obtain an initial depth uncertainty model; obtain training depth uncertainty parameter values from the non-transient storage medium; obtain corresponding training depth uncertainty values; generate a trained depth uncertainty model by training the initial depth uncertainty model using the training depth uncertainty parameter values and the corresponding training depth uncertainty values; and store the trained depth uncertainty model.

20 Claims, 7 Drawing Sheets

SYSTEMS AND METHODS FOR GENERATING DEPTH UNCERTAINTY VALUES AS A FUNCTION OF POSITION IN A SUBSURFACE VOLUME OF INTEREST

FIELD OF THE DISCLOSURE

The present disclosure relates to systems and methods for generating depth uncertainty values as a function of position in a subsurface volume of interest.

SUMMARY

An aspect of the present disclosure relates to a computer-implemented method for training a depth uncertainty model to generate depth uncertainty values as a function of position in a subsurface volume of interest. The method may be implemented in a computer system that comprises a physical computer processor and non-transient storage medium. The method may include a number of steps. One step may include obtaining an initial depth uncertainty model. Another step may include obtaining training depth uncertainty parameter values. The training depth uncertainty parameter values may be derived from subsurface data. Yet another step may include obtaining corresponding training depth uncertainty values. The training depth uncertainty values may correspond to the training depth uncertainty parameter values. A first training depth uncertainty value may specify a first training uncertainty corresponding to a first training depth value. Another step may include generating a trained depth uncertainty model by training the initial depth uncertainty model using the training depth uncertainty parameter values and the corresponding training depth uncertainty values. Yet another step may include storing the trained depth uncertainty model.

In implementations, another step may include obtaining target depth uncertainty parameter values as a function of position in the subsurface volume of interest. The target depth uncertainty parameter values may be derived from subsurface data. Yet another step may include generating target depth uncertainty values as a function of position in the subsurface volume of interest by applying the trained depth uncertainty model to the target depth uncertainty parameter values, wherein a first target depth uncertainty value specifies a first target uncertainty corresponding to a first target depth value.

In implementations, the computer system may further include a display. The computer-implemented method may include another step relating to generating a representation of depth uncertainty as a function of position in the subsurface volume of interest using visual effects to depict at least a portion of the target depth uncertainty values. Another step may include displaying the representation on the display.

In implementations, the target depth uncertainty values may be based on a lower P10 value and an upper P90 value.

In implementations, the training depth uncertainty values may include synthetic values.

In implementations, the depth uncertainty parameters may include depth below mud line, subsalt, overburden complexity, dip, well type, closure type, seismic type, seismic velocity, and image quality.

In implementations, the initial depth uncertainty model and the trained depth uncertainty model may include one of a regression, a neural network, and a random forest.

An aspect of the present disclosure relates to a computer-implemented method for generating depth uncertainty values as a function of position in a subsurface volume of interest. The method may be implemented in a computer system that includes a physical computer processor and a non-transient storage medium. The method may include a number of steps. One step may include obtaining a trained depth uncertainty model. The trained depth uncertainty model may have been generated by applying an initial depth uncertainty model to training depth uncertainty parameter values and training depth uncertainty values. The training depth uncertainty parameter values may be derived from subsurface data. The training depth uncertainty values may correspond to the training depth uncertainty parameter values. A first training depth uncertainty value may specify a first training uncertainty corresponding to a first training depth value. Another step may include obtaining target depth uncertainty parameter values as a function of position in the subsurface volume of interest. The target depth uncertainty parameter values may be derived from subsurface data. Yet another step may include generating target depth uncertainty values as a function of position in the subsurface volume of interest by applying the trained depth uncertainty model to the target depth uncertainty parameter values. A first target depth uncertainty value may specify a first target uncertainty corresponding to a first target depth value.

In implementations, the computer system may further include a graphical user interface. Another step may include generating a representation of depth uncertainty as a function of position in the subsurface volume of interest using visual effects to depict at least a portion of the target depth uncertainty values. Yet another step may include displaying the representation on the graphical user interface.

In implementations, the target depth uncertainty values may be based on a lower P10 value and an upper P90 value.

In implementations, the training depth uncertainty values may include synthetic values.

In implementations, the depth uncertainty parameters may include depth below mud line, subsalt, overburden complexity, dip, well type, closure type, seismic type, seismic velocity, and image quality.

In implementations, the initial depth uncertainty model and the trained depth uncertainty model may include one of a regression, a neural network, and a random forest.

An aspect of the present disclosure relates to a system for generating depth uncertainty values as a function of position in a subsurface volume of interest. The system may include electronic storage. The system may also include a physical computer processor configured by machine readable instructions to perform a number of steps. One step may be to obtain a trained depth uncertainty model. The trained depth uncertainty model may have been generated by applying an initial depth uncertainty model to training depth uncertainty parameter values and training depth uncertainty values. The training depth uncertainty parameter values may be derived from subsurface data. The training depth uncertainty values may correspond to the training depth uncertainty parameter values. A first training depth uncertainty value may specify a first training uncertainty corresponding to a first training depth value. Another step may be to obtain target depth uncertainty parameter values as a function of position in the subsurface volume of interest. The target depth uncertainty parameter values may be derived from subsurface data. Yet another step may be to generate target depth uncertainty values as a function of position in the subsurface volume of interest by applying the trained depth uncertainty model to the target depth uncertainty parameter values. A first target depth uncertainty value may specify a first target uncertainty corresponding to a first target depth value.

In implementations, the system may further include a display. Another step may be to generate a representation of depth uncertainty as a function of position in the subsurface volume of interest using visual effects to depict at least a portion of the target depth uncertainty values. Yet another step may be to display the representation.

In implementations, the target depth uncertainty values may be based on a lower P10 value and an upper P90 value.

In implementations, the training depth uncertainty values may include synthetic values.

In implementations, the depth uncertainty parameters may include depth below mud line, subsalt, overburden complexity, dip, well type, closure type, seismic type, seismic velocity, and image quality.

In implementations, the initial depth uncertainty model and the trained depth uncertainty model may include one of a regression, a neural network, and a random forest.

In implementations, the depth uncertainty values may include mis-ties.

These and other features and characteristics of the present technology, as well as the methods of operation and functions of the related elements of structure and the combination of parts, will become more apparent upon consideration of the following description and the appended Claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the presently disclosed technology. As used in the specification and in the Claims, the singular form of "a", "an", and "the" include plural referents unless the context clearly dictates otherwise.

The technology disclosed herein, in accordance with various implementations, is described in detail with reference to the following figures. The drawings are provided for purposes of illustration and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Figure 1:
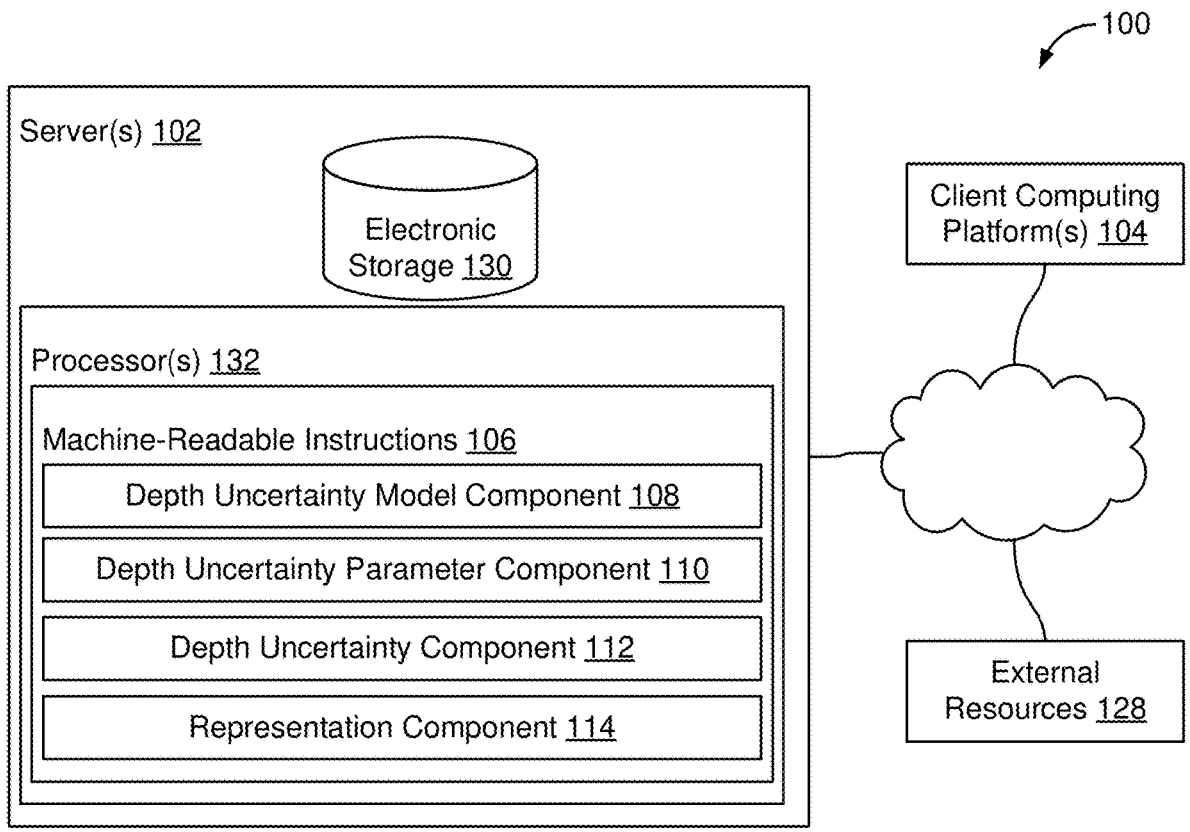
FIG. 1 shows a system configured for generating depth uncertainty values as a function of position in a subsurface volume of interest, in accordance with some implementations.

Reliable depth uncertainty estimations are a pivotal part of resource assessment and well drilling. Inaccurate or imprecise estimations could lead to negative impacts on resource assessments and business decisions. Conventional depth uncertainty methods that predict depth uncertainty rely on velocity-anisotropy trade off and fail to consider other factors, such as asset maturity, target seismic data, etc. These conventional methods generally produce depth uncertainty estimations that are larger than what is found in data from drilling. Other conventional methods qualitatively estimate depth uncertainty and do not provide quantitative uncertainty estimations. Still other methods may be based on an empirical formula or oversimplified models that cannot include multiple different factors (e.g., inaccurate velocities, anisotropies, fault and horizon picks and so on) affecting the depth error or uncertainty together, which make depth uncertainty analysis very challenging.

Features of the present disclosure utilize machine learning techniques (e.g., gradient boost regression, random forest, neural network, etc.) to train a depth uncertainty model which can take into account uncertainties stemming from multiple, different depth uncertainty parameters (e.g., depth below mud line (DBML), dip, seismic type, seismic velocity, well type/maturity, subsalt, closure type, image quality, and overburden complexity) corresponding to known assets and uncertainties in the target labels to predict the depth uncertainty ranges for a new asset. The presently disclosed technology improves upon conventional workflows by predicting a narrower depth uncertainty range that is quantitative. In one example, the presently disclosed technology uses training depth uncertainty parameter values and corresponding training depth uncertainty values to train a depth uncertainty model. The trained depth uncertainty model can be used to generate target depth uncertainty values as a function of position in the subsurface volume of interest by applying the trained depth uncertainty model to the target depth uncertainty parameter values. In some implementations, the target depth uncertainty parameter values and/or the target depth uncertainty values may be used to generate a representation of the subsurface volume of interest. The presently disclosed technology is able to estimate an uncertainty range that can capture 95% of the target depth uncertainty values. The presently disclosed technology provides information that can be utilized to estimate drilling depth uncertainties and otherwise affect drilling decisions.

Reference will now be made in detail to various implementations, examples of which are illustrated in the accompanying drawings. In the following detailed description, numerous details may be set forth in order to provide a thorough understanding of the present disclosure and the implementations described herein. However, implementations described herein may be practiced without such details. In other instances, some methods, procedures, components, and apparatuses may not be described in detail, so as not to unnecessarily obscure aspects of the implementations.

Disclosed below are methods, systems, and computer readable storage media that may generate depth uncertainty values as a function of position in a subsurface volume of interest. A subsurface volume of interest may include any area, region, and/or volume underneath a surface. Such a volume may include, or be bounded by, a water surface, a ground surface, and/or another surface. In some implementations, the subsurface volume of interest may encompass multiple well sites.

FIG. 1 illustrates a system 100 configured for generating depth uncertainty values as a function of position in a subsurface volume of interest, in accordance with some implementations. In implementations, system 100 may generate depth uncertainty values as a function of position in a subsurface volume of interest based on depth uncertainty parameter values. The depth uncertainty parameter values may be depth uncertainty parameters that impact depth uncertainty, including, for example, depth below mud line (DBML), seismic velocity, subsalt, overburden complexity, dip, well type/maturity, and/or other relevant depth uncertainty parameters. It should be appreciated that this is a non-exhaustive list and that there are other depth uncertainty parameters that impact the depth uncertainty, including, for example, closure type, seismic type, and image quality. The depth uncertainty parameter values may be derived from subsurface data. Subsurface data may include seismic data, well data, and/or other data. The depth uncertainty values may include, for example, mis-ties and/or other depth uncertainty values. In some implementations, system 100 may include a server 102. Server(s) 102 may be configured to communicate with a client computing platform 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include an instruction component. The instruction components may include computer program components. The instruction components may include a depth uncertainty model component 108, a depth uncertainty parameter component 110, a depth uncertainty component 112, a representation component 114, and/or other instruction components.

Depth uncertainty model component 108 may be configured to obtain an initial depth uncertainty model. The initial depth uncertainty model may be obtained from the non-transient storage medium and/or another source. The initial depth uncertainty model may be based on machine learning techniques to map at least one variable to at least another variable. For example, the initial depth uncertainty model may receive depth uncertainty parameter values, depth uncertainty values, and/or other data as input and corresponding output data. The initial depth uncertainty model may be "untrained" or "unconditioned," indicating it may not estimate an output based on the input as accurately as a "trained" or "conditioned" model.

In some implementations, an initial depth uncertainty model may be trained to generate a trained depth uncertainty model. The initial depth uncertainty model may be trained using training data. The training data may include training depth uncertainty parameter values, depth uncertainty values, and/or other data, as will be described in greater detail below. The training data may be derived from seismic data, well data, and/or other data. The seismic data may be collected from multiple seismic data sites/surveys (i.e., on a pad or regional scale) and correspond to different geophysical collection methods (i.e., 2D seismic, 3D seismic, multicomponent 3D seismic, time-lapse (4D) seismic, microseismic, VSP, and the like).

As an example, seismic data may be obtained by sending energy into a subsurface volume of interest using surface or subsurface sources and receiving the signal reflected off of a subsurface feature at surface or subsurface receivers. Zero-offset surface source-receiver pairs may send energy waves into the subsurface volume of interest. Energy waves may reflect or refract off the subsurface feature. Source-receiver pairs may receive the reflected and refracted energy waves which may be processed and converted into seismic data. In some implementations, a surface or subsurface source may send subsurface energy into the subsurface, which may then be reflected and/or refracted by the subsurface features and may be recorded at the surface or subsurface receivers at various distances away from the source. Subsurface energy may include acoustic compressional or shear waves. For example, the surface or subsurface source may generate acoustic compressional or shear waves and direct them towards a subsurface region that includes various lithologies (e.g., underground rock structures). The seismic data may be generated from subsurface signals (e.g., the reflections of the subsurface energy off of the various subsurface lithologies) and received by sensors, such as geophones and/or other acoustic detectors. The seismic data may be stored in a non-transient storage medium and/or another source.

The initial depth uncertainty model may include one or more components of a gradient boost regression, a random forest, a neural network, a regression, and/or other machine learning techniques. It should be appreciated that, in some implementations, the depth uncertainty model may include, for example, convolutional neural networks, reinforcement learning, transfer learning, and/or other machine learning techniques. In one example, the depth uncertainty model may be a supervised machine learning model. In one example, the depth uncertainty model may be an unsupervised machine learning model.

Generally, machine learning models may predict results on a point-to-point basis; however, the depth uncertainty model can be used to generate a range of possible outcomes. The depth uncertainty model may use P10, P90, and/or other P values to generate a prediction range. In implementations, the depth uncertainty model can be used to generate a blind test score based on a percentage of known, true depth uncertainty values within the prediction range.

In implementations, the depth uncertainty model may use an ensemble-based uncertainty estimation using a Bayesian framework. For example, the depth uncertainty model may use a gradient boost regression with a quantile loss method.

Depth uncertainty model component 108 may be configured to train the initial depth uncertainty model. Training may include applying the initial depth uncertainty model to the training depth uncertainty parameter values to generate a first iteration of depth uncertainty values. The initial depth uncertainty model may be adjusted to more accurately estimate the depth uncertainty values based on differences between the first iteration of depth uncertainty values and the training depth uncertainty values that correspond to the training depth uncertainty parameter values. This is repeated numerous times until the initial depth uncertainty model is "trained," i.e., it is able to output depth uncertainty values that are consistently within a threshold of the training depth uncertainty values. In some implementations, the threshold may depend on the speed of the depth uncertainty model, resources used by the depth uncertainty model, and/or other optimization metrics. This threshold may be based on an average of values, a maximum number of values, and/or other parameters. It should be appreciated that other metrics may be applied to determine that the depth uncertainty model is "conditioned" or "trained."

In implementations, training the initial depth uncertainty model may include generating synthetic depth uncertainty values using seismic data and/or other data from existing assets. Training may also include filtering the training data, as described in greater detail below. Training may also include applying the depth uncertainty model to the filtered training data. Training may include validating the trained model by using testing data. The testing data may include depth uncertainty parameter values that are not a part of the training data. Training may also include filtering the testing data. Training may also include applying the trained depth uncertainty model to the testing data to generate depth uncertainty values. Training may also include visualizing the depth uncertainty values and determining a blind test score.

The trained depth uncertainty model may be able to predict depth uncertainty values by recognizing patterns in the training data. In some implementations, the trained depth uncertainty model may have generated a linear or non-linear relationship between the depth uncertainty parameter values and the depth uncertainty values. In implementations, the various input data may be weighted differently. For example, different types of depth uncertainty parameter values may be weighted differently (e.g., DBML values may be weighted differently than seismic type values, which may be weighted differently than closure type values, and so on).

The depth uncertainty values as a function of position in the subsurface volume of interest may be generated by applying the depth uncertainty model to depth uncertainty parameter values.

In implementations, depth uncertainty model component 108 may be configured to obtain a trained depth uncertainty model. The trained depth uncertainty model may be obtained from the non-transient storage medium and/or another source. As discussed above, the trained depth uncertainty model may be trained using training data on an initial depth uncertainty model. The trained depth uncertainty model may have been trained, as described herein, to generate, or predict, depth uncertainty as a function of position in the subsurface volume of interest.

In implementations, depth uncertainty model component 108 may be configured to generate a trained depth uncertainty model by training an initial depth uncertainty model, as discussed above.

Depth uncertainty parameter component 110 may be configured to obtain depth uncertainty parameter values. The depth uncertainty parameter values may be obtained from the non-transient storage medium and/or another source. The depth uncertainty parameter values may refer to training depth uncertainty parameter values, testing depth uncertainty parameter values, and/or target depth uncertainty parameter values. The training depth uncertainty parameter values may be used to train the initial depth uncertainty model. The testing depth uncertainty parameter values may be used to validate the depth uncertainty model. The target depth uncertainty parameter values may be used to generate target depth uncertainty values. The depth uncertainty parameter values may initially be collected and/or measured via sensors in the subsurface volume of interest (e.g., field data) and/or be generated through the use of simulation models (e.g., synthetic data). The depth uncertainty parameter values may be stored. The stored depth uncertainty parameter values may be obtained and/or used as part of the training data.

The depth uncertainty parameter values may include, and/or be derived from, seismic data, well data, and/or other data. The depth uncertainty parameter values may correspond to depth uncertainty parameters that impact the depth uncertainty values. For example, the depth uncertainty parameter values may include values quantifying depth below mud line (DBML), dip, seismic type, seismic velocity, well type/maturity, subsalt, closure type, image quality, overburden complexity, and/or other depth uncertainty parameters. As an example, the well type/maturity value may be a value of 0 (exploration), 1 (appraisal), or 2 (development). The image quality value may be a value of 0 (low), 1 (medium), 2 (high), or 3 (very high). The seismic data type value may be 0 (NAZ-Narrow Azimuth), 1 (WAZ-Wide Azimuth), 2 (MAZ-Multi Azimuth), or 3 (OBN-Ocean Bottom Node). The subsalt value may be 0 (no) or 1 (yes). The closure type value may be 0 (3 way) or 1 (4 way). The overburden complexity may be 0 (low), 1 (medium), or 2 (high). These values are exemplary, and it should be appreciated that the values can be defined differently.

In implementations, the depth uncertainty parameter values may be filtered. For example, the depth uncertainty parameter values may be compared to a training depth uncertainty parameter value range. Depth uncertainty parameter values that fall outside the range are removed. For example, dip or DBML values that fall outside the depth uncertainty parameter value range are removed. In some implementations, notifications are provided that indicate that the depth uncertainty parameter values are outside the depth uncertainty parameter value range (e.g., depth uncertainty parameter values out of range or depth uncertainty parameter values are close to out of range). Filtering may also include removing any duplicate data. Filtering may include removing outlier depth uncertainty values greater than plus or minus 2000 feet. Filtering may include values that fall within the bounds of the depth uncertainty parameter value range, or prediction range.

In implementations, the depth uncertainty parameter component 110 may be configured to generate depth uncertainty parameter values. This may be accomplished by a physical computer processor. The depth uncertainty parameter values may be generated by using existing datasets extracted, or otherwise derived from, seismic data, well data, and/or other data.

Depth uncertainty component 112 may be configured to obtain depth uncertainty values. The depth uncertainty values may be obtained from the non-transient storage medium and/or another source. The depth uncertainty values may refer to training depth uncertainty values, testing depth uncertainty values, and/or target depth uncertainty values. The training depth uncertainty values may be used to train the initial depth uncertainty model. The testing depth uncertainty values may be used to validate the depth uncertainty model. The target depth uncertainty values may be generated based on applying the trained depth uncertainty model to the target depth uncertainty parameter values. The training depth uncertainty values may be generated through the use of simulation models (e.g., synthetic data). The synthetic depth uncertainty values may be stored. The stored synthetic depth uncertainty values may be obtained and/or used as part of the training data.

The depth uncertainty values may include mis-ties and/or other depth uncertainty values. Mis-ties may quantify a difference between predicted values of seismic data and actual values of seismic data. The depth uncertainty values may correspond to the depth uncertainty parameter values. The depth uncertainty values may include a set of lower values representing a bottom of a prediction range and a set of larger values representing a top of a prediction range. In some implementations, a first depth uncertainty value may specify a first uncertainty corresponding to a first depth value. In implementations, depth uncertainty values may be used to generate a blind test score based on a percentage of known, true depth uncertainty values within the prediction range corresponding to the depth uncertainty values.

In implementations, the depth uncertainty component 112 may be configured to generate depth uncertainty values. This may be accomplished by a physical computer processor. The training depth uncertainty values can be generated by extracting, refining, or otherwise deriving the data from the seismic data, and/or other data. In some implementations, training depth uncertainty values may be generated using a simulation model. For example, using OBN seismic depth as the ground truth analog, the synthetic mis-ties may be calculated as the difference of other seismic depth to OBN seismic depth.

The target depth uncertainty values can be generated by applying the trained depth uncertainty model to the target depth uncertainty parameter values. As discussed herein, the trained depth uncertainty model can accurately estimate the depth uncertainty values using the depth uncertainty parameter values as input because the trained depth uncertainty model has been "trained" or "conditioned."

Representation component 114 may be configured to generate and/or display the depth uncertainty. This may be generated and/or displayed on a graphical user interface. In some examples, the generating may be performed by a processor and the output may be stored in a non-transient storage medium and/or displayed via a graphical user interface. The depth uncertainty may be a representation of the depth uncertainty parameter values and/or depth uncertainty values as a function of position in the subsurface volume of interest. The representation may use visual effects to display at least some of the depth uncertainty parameter values and/or depth uncertainty values as a function of position in the subsurface volume of interest. In some implementations, a visual effect may include a visual transformation of the representation. A visual transformation may include a visual change in how the representation is presented or displayed. In some implementations, a visual transformation may include a visual zoom, a visual filter, a visual rotation, and/or a visual overlay (e.g., text and/or graphics overlay). The visual effect may include using a temperature map, or other color coding, to indicate which positions in the subsurface volume of interest have higher or lower values.

In some implementations, representation component 114 may be configured to display the representation. The representation may be displayed on a graphical user interface and/or other displays. The representation may be used to more easily identify the depth uncertainty in a subsurface volume of interest.

In some implementations, server(s) 102, client computing platform(s) 104, and/or external resources 128 may be operatively linked via an electronic communication link. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include a processor configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, a processor 134, and/or another component. Server(s) 102 may include communication lines, or ports, to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transient electronic storage and/or non-transient storage media that electronically stores information. Electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include a virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include a physical computer processor, a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, and/or other components. Processor(s) 132 may be configured to execute components 108, 110, 112, 114, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include a physical processor during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 132 includes multiple processing units, components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, components 108, 110, 112, and/or 114 may be eliminated, and some or all of its functionality may be provided by other ones of components 108, 110, 112, and/or 114. As an example, processor(s) 132 may be configured to execute an additional component that may perform some or all of the functionality attributed below to components 108, 110, 112, and/or 114.

Figure 2:
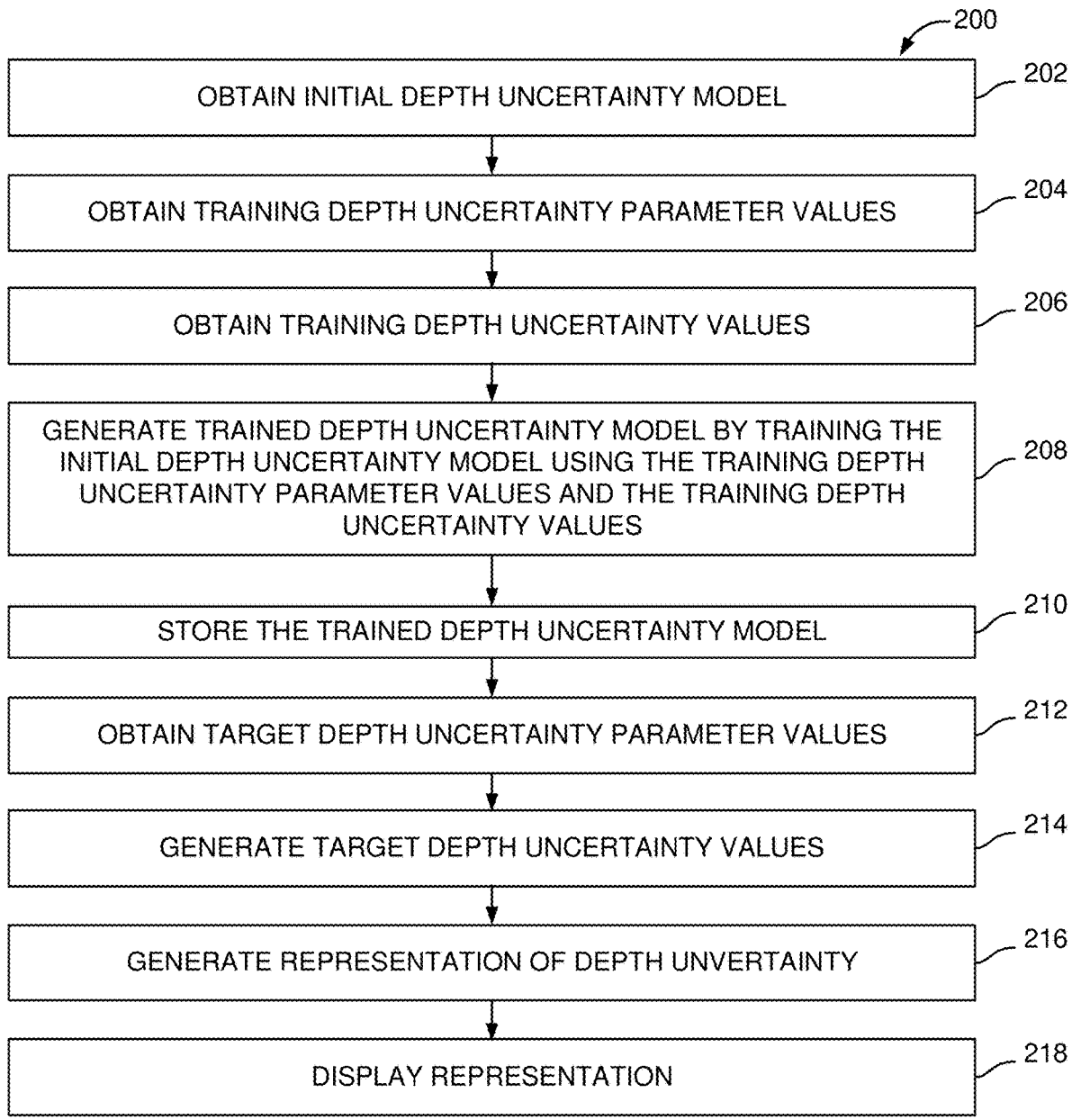
FIG. 2 is a flowchart of a method of generating depth uncertainty values as a function of position in a subsurface volume of interest, in accordance with some implementations.

FIG. 2 illustrates a method 200 for generating depth uncertainty values as a function of position in a subsurface volume of interest, in accordance with some implementations. The operations of method 200 presented below are intended to be illustrative. In some implementations, method 200 may be accomplished with an additional operation not described, and/or without one of the operations discussed. Additionally, the order in which the operations of method 200 is illustrated in FIG. 2 and described below is not intended to be limiting.

In some implementations, method 200 may be implemented in a processing device (e.g., a digital processor, a physical computer processor, an analog processor, a digital circuit designed to process information, an analog circuit designed to process information, a state machine, and/or other mechanisms for electronically processing information). The processing device may include a device executing some or all of the operations of method 200 in response to instructions stored electronically on an electronic storage medium. The processing device may include a device configured through hardware, firmware, and/or software to be specifically designed for execution of one of the operations of method 200.

An operation 202 may include obtaining an initial depth uncertainty model. The initial depth uncertainty model may be "untrained" or "unconditioned," indicating it may not estimate an output based on the input as accurately as a "trained" or "conditioned" model. In some implementations, an initial depth uncertainty model may be trained into a trained depth uncertainty model. The initial depth uncertainty model may be trained using training data. The initial depth uncertainty model may include a machine learning model. The machine learning model may include a gradient boost regression, a random forest, a neural network, a regression, and/or other machine learning techniques, and/or other machine learning models. Operation 202 may be performed by a hardware processor configured by machine-readable instructions including a component that is the same as or similar to depth uncertainty model component 108, in accordance with some implementations.

An operation 204 may include obtaining training depth uncertainty parameter values. The training depth uncertainty parameter values may correspond to depth uncertainty parameters that impact the depth uncertainty values. In some implementations, the training depth uncertainty parameter values may be derived from subsurface data. In implementations, the training depth uncertainty parameter values may include values quantifying DBML, dip, seismic type, seismic velocity, well type/maturity, subsalt, closure type, image quality, overburden complexity, and/or other depth uncertainty parameters as a function of position in the subsurface volume of interest. Operation 204 may be performed by a hardware processor configured by machine-readable instructions including a component that is the same as or similar to depth uncertainty parameter component 110, in accordance with some implementations.

An operation 206 may include obtaining corresponding training depth uncertainty values. The training depth uncertainty values may include a mis-tie and/or other depth uncertainty values. The training depth uncertainty values may correspond to the training depth uncertainty parameter values. For example, a first training depth uncertainty value may specify a first uncertainty corresponding to a first training depth value. The training depth uncertainty values may quantify differences between predicted and actual values of seismic data as a function of position in the subsurface volume of interest. In implementations, the training depth uncertainty values may be range of values including a set of lower values and a set of larger values. Operation 206 may be performed by a hardware processor configured by machine-readable instructions including a component that is the same as or similar to depth uncertainty component 112, in accordance with some implementations.

An operation 208 may include generating a trained depth uncertainty model by training the initial depth uncertainty model using training depth uncertainty parameter values and corresponding training depth uncertainty values. The trained depth uncertainty model may be able to generate, or predict, depth uncertainty values. In implementations, test depth uncertainty values may be used to generate a blind test score based on a percentage of known, true depth uncertainty values that correspond to the training depth uncertainty values. Operation 208 may be performed by a hardware processor configured by machine-readable instructions including a component that is the same as or similar to depth uncertainty model component 108, in accordance with some implementations.

In some implementations, operation 210 may include storing the trained depth uncertainty model. Operation 210 may be performed by a hardware processor configured by machine-readable instructions including a component that is the same as or similar to depth uncertainty model component 108, in accordance with some implementations.

An operation 212 may include obtaining target depth uncertainty parameter values as a function of position in the subsurface volume of interest. The target depth uncertainty parameter values may include, and/or be derived from, seismic data, well data, and/or other data. The target depth uncertainty parameter values may correspond to depth uncertainty parameters that impact the depth uncertainty values. For example, the target depth uncertainty parameter values may include values quantifying DBML, dip, seismic type, seismic velocity, well type/maturity, subsalt, closure type, image quality, overburden complexity, and/or other depth uncertainty parameters. Operation 212 may be performed by a hardware processor configured by machine-readable instructions including a component that is the same as or similar to depth uncertainty parameter component 110, in accordance with some implementations.

An operation 214 may include generating target depth uncertainty values as a function of position in the subsurface volume of interest by applying the trained depth uncertainty model to the target depth uncertainty parameter values. The target depth uncertainty values may include a mis-tie and/or other depth uncertainty values. The target depth uncertainty values may correspond to the target depth uncertainty parameter values. For example, a first target depth uncertainty value may specify a first uncertainty corresponding to a first target depth value. The target depth uncertainty values may quantify differences between predicted and actual values of seismic data as a function of position in the subsurface volume of interest. In implementations, target depth uncertainty values may be based on a lower P10 value and an upper P90 value. Operation 214 may be performed by a hardware processor configured by machine-readable instructions including a component that is the same as or similar to depth uncertainty component 112, in accordance with some implementations.

An operation 216 may include generating a representation of depth uncertainty as a function of position in the subsurface volume of interest. The representation may be generated using visual effects to display at least a portion of the target depth uncertainty values as a function of position in the subsurface volume of interest. Operation 216 may be performed by a hardware processor configured by machine-readable instructions including a component that is the same as or similar to representation component 114, in accordance with some implementations.

An operation 218 may include displaying the representation. Operation 218 may be performed by a hardware processor configured by machine-readable instructions including a component that is the same as or similar to representation component 114, in accordance with some implementations.

Figure 3:
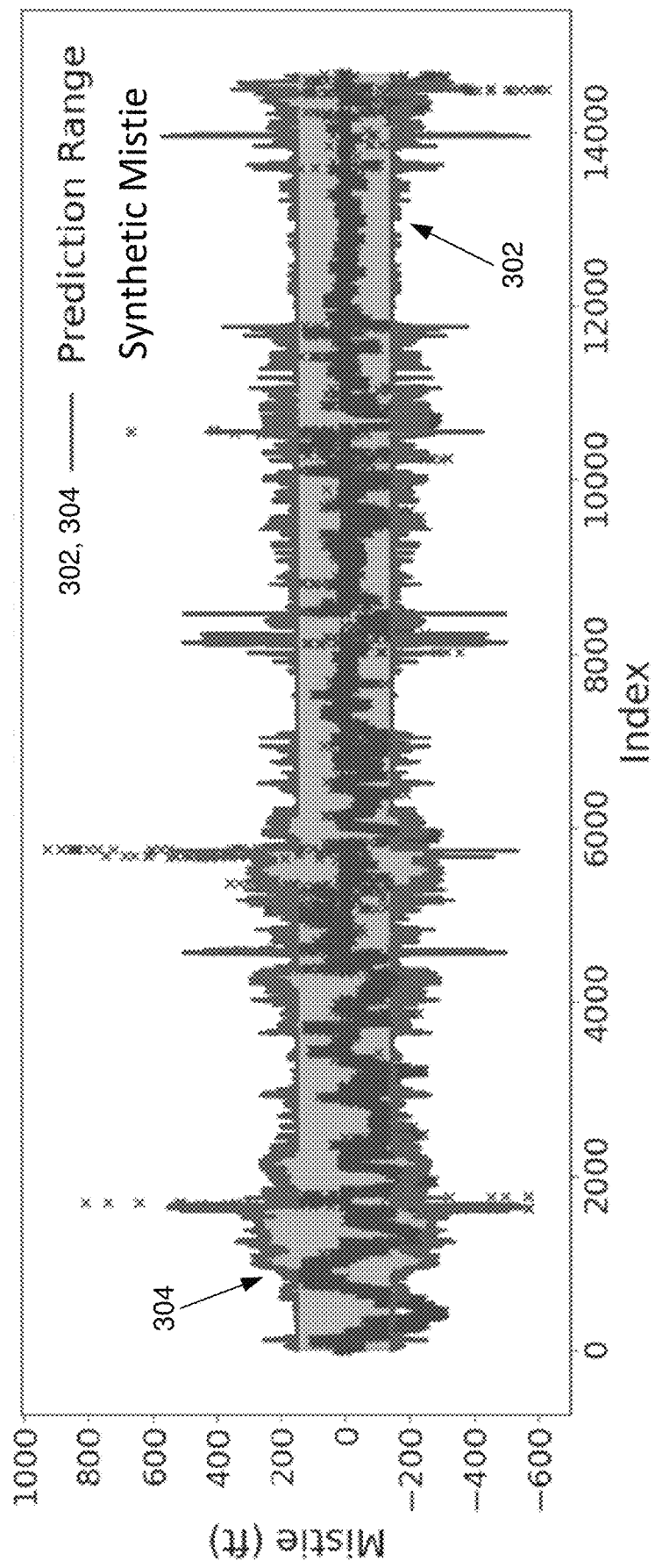
FIG. 3 illustrates an example graph comparing estimated depth uncertainty values to synthetic mis-ties, in accordance with some implementations.

FIG. 3 illustrates an example graph comparing estimated depth uncertainty values to synthetic mis-ties, in accordance with some implementations. As illustrated, the prediction range, represented by the lines 302, 304, is within 150 feet of the synthetic mis-ties, where each mis-tie value is represented by an "x." The lower values on the prediction range, represented by line 302, are generated using a P10 value while the larger values of the prediction range, represented by line 304, are generated using a P90 value. The accuracy for this blind test is 92%.

Figure 4:
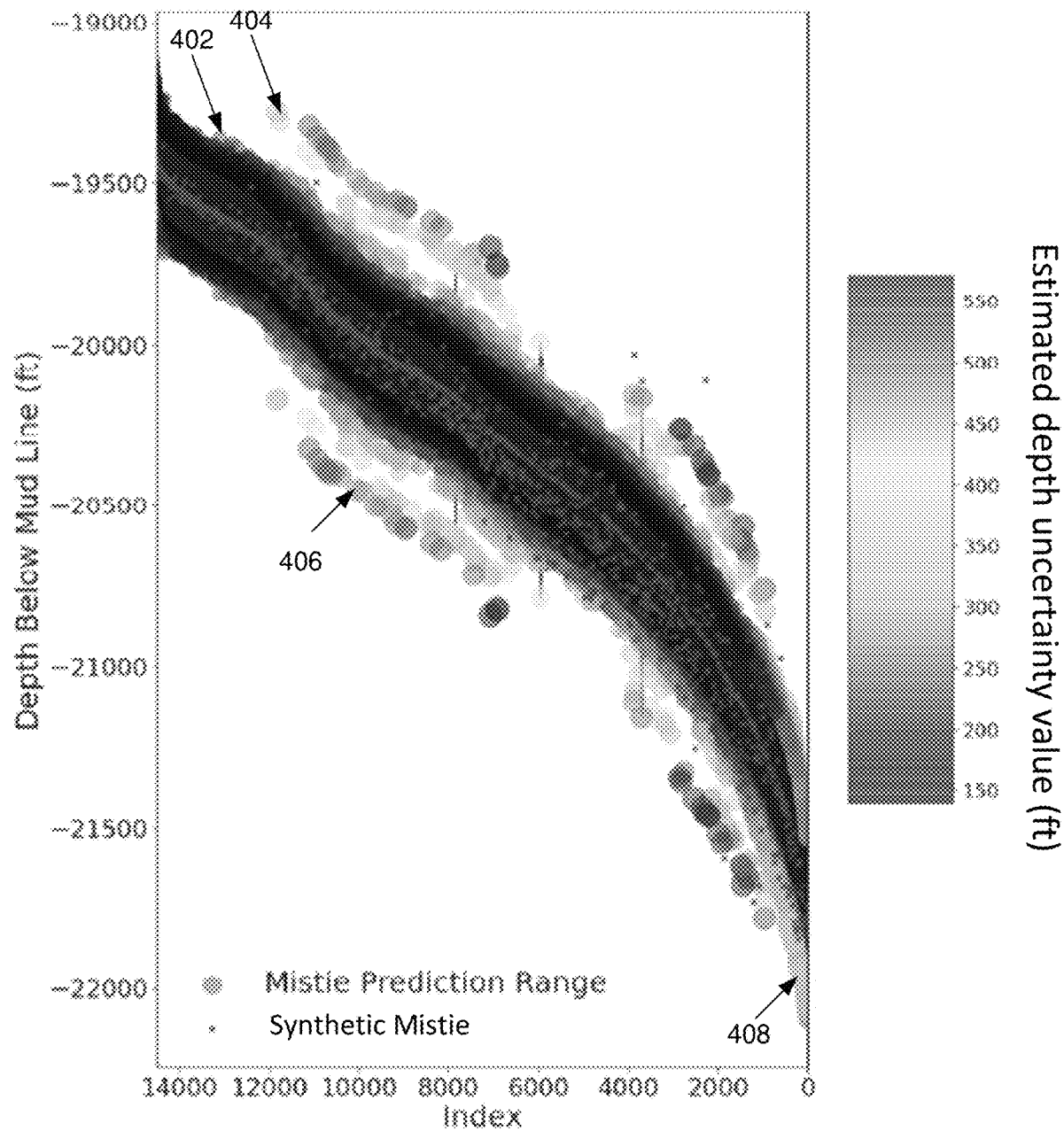
FIG. 4 illustrates an example graph comparing estimated depth uncertainty values to synthetic mis-ties, in accordance with some implementations.

FIG. 4 illustrates an example graph comparing estimated depth uncertainty values to synthetic mis-ties, in accordance with some implementations. As illustrated, the model-generated depth uncertainty values are represented by the larger circles at the bottom and top of the dots. Example circles 402, 404, 406, 408 are identified with reference numbers, though it should be appreciated that not every circle representing the generated depth uncertainty values are identified with a reference number. The dots represent the synthetic mis-ties. Here, every $10^{th}$ synthetic mis-tie is shown. As expected, the mis-tie increases with depth, with darker colors at the top and lighter colors at the bottom.

Figure 5:
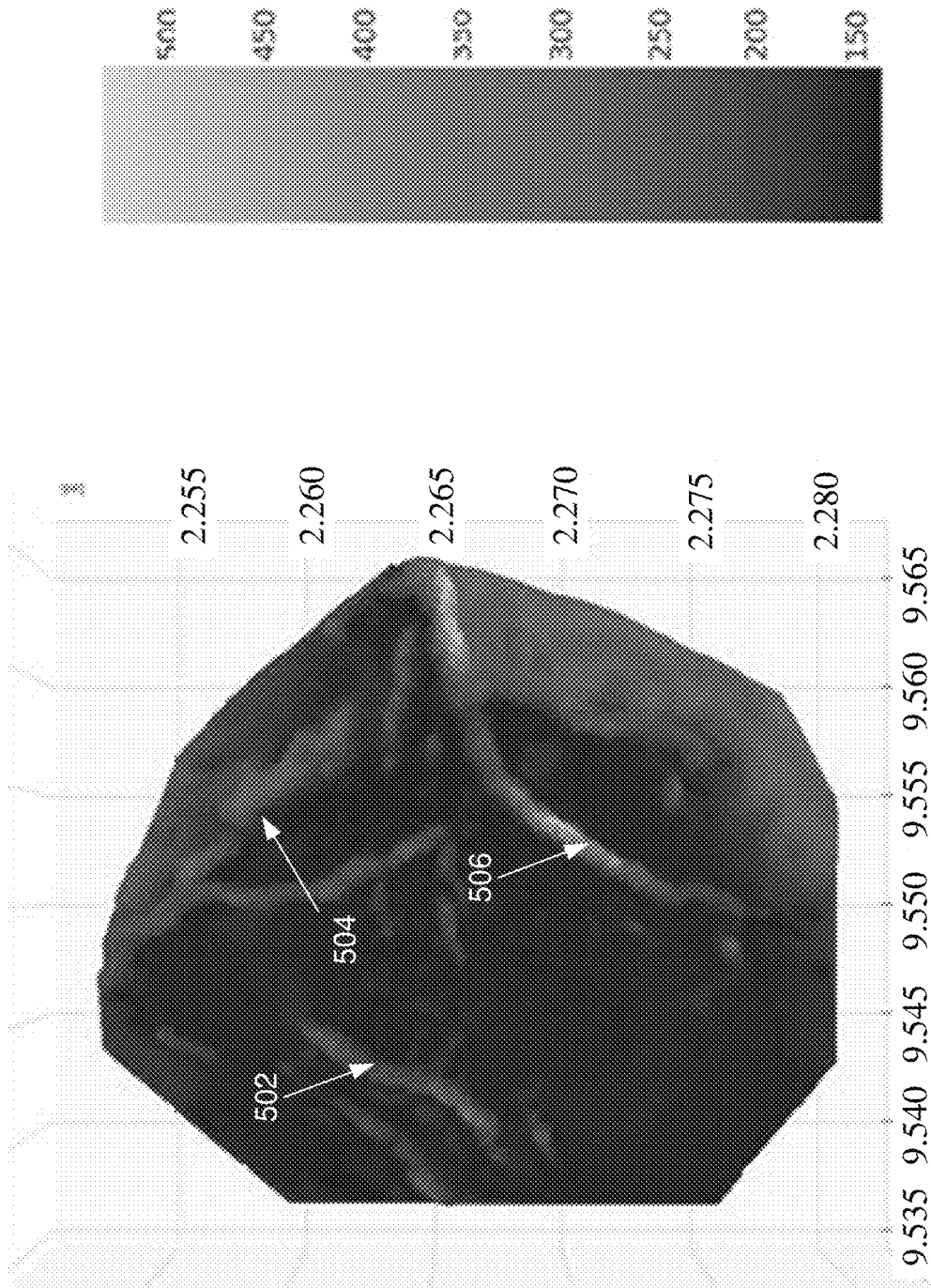
FIG. 5 illustrates an example map of a horizon in the x-y plane with estimated depth uncertainty values on the z-axis, in accordance with some implementations.

FIG. 5 illustrates an example map of a horizon in the x-y plane with estimated depth uncertainty values on the z-axis, in accordance with some implementations. As illustrated, a map view of a horizon shows a predicted mis-tie in the z direction. Example linear features 502, 504, 506 represent faults in the horizon, though it should be appreciated that not every fault in the map is identified with a reference number. Generally, faults may have depth uncertainty parameter values (e.g., higher dips, lower image quality, etc.) that cause higher mis-ties. As illustrated, these linear features 502, 504, 506 are lighter indicating the higher mis-ties.

Figure 6:
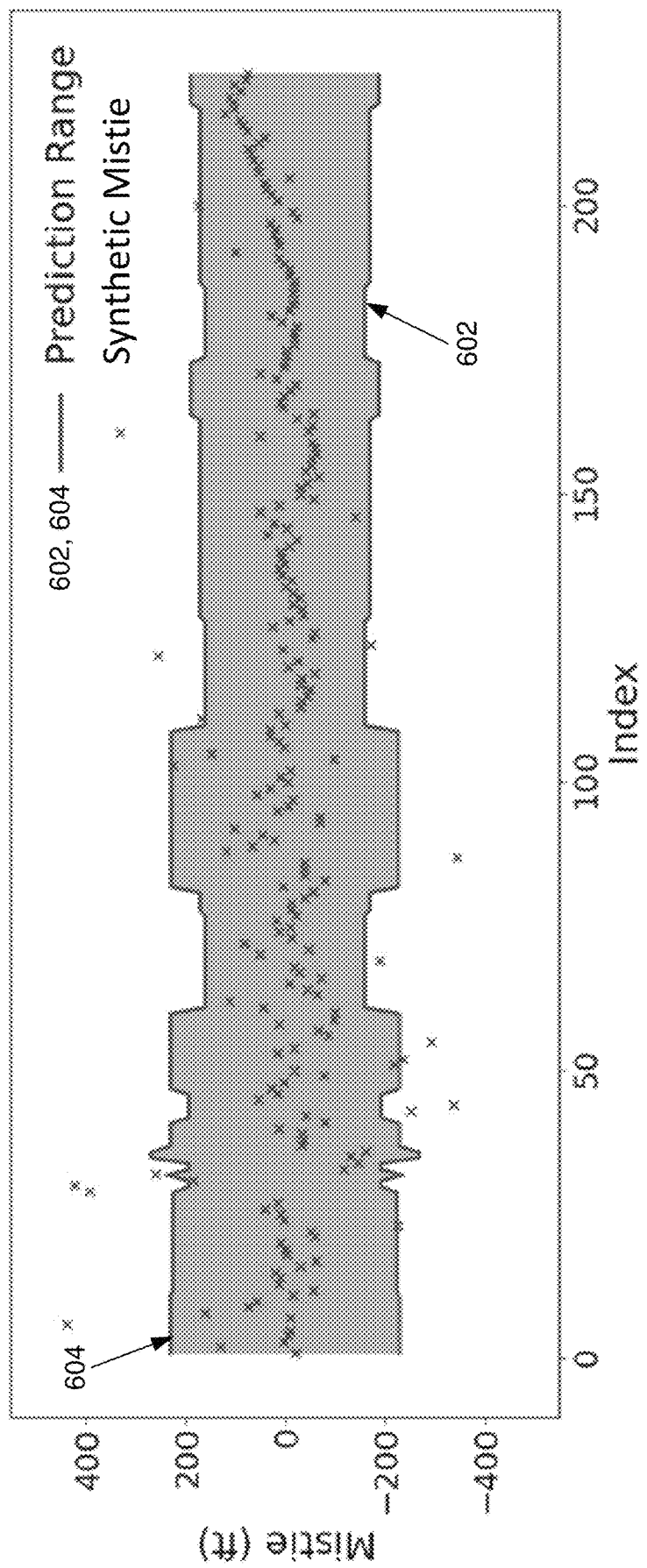
FIG. 6 illustrates an example graph comparing estimated depth uncertainty values to synthetic mis-ties, in accordance with some implementations.

FIG. 6 illustrates an example graph comparing estimated depth uncertainty values to synthetic mis-ties, in accordance with some implementations. As illustrated, the prediction range, represented by the lines 602, 604, is within about 170 feet of the synthetic mis-ties, where each mis-tie value is represented by an "x." The lower values on the prediction range, represented by line 602, are generated using a P10 value while the larger values of the prediction range, represented by line 604, are generated using a P90 value. The accuracy for this blind test is 97%.

Figure 7:
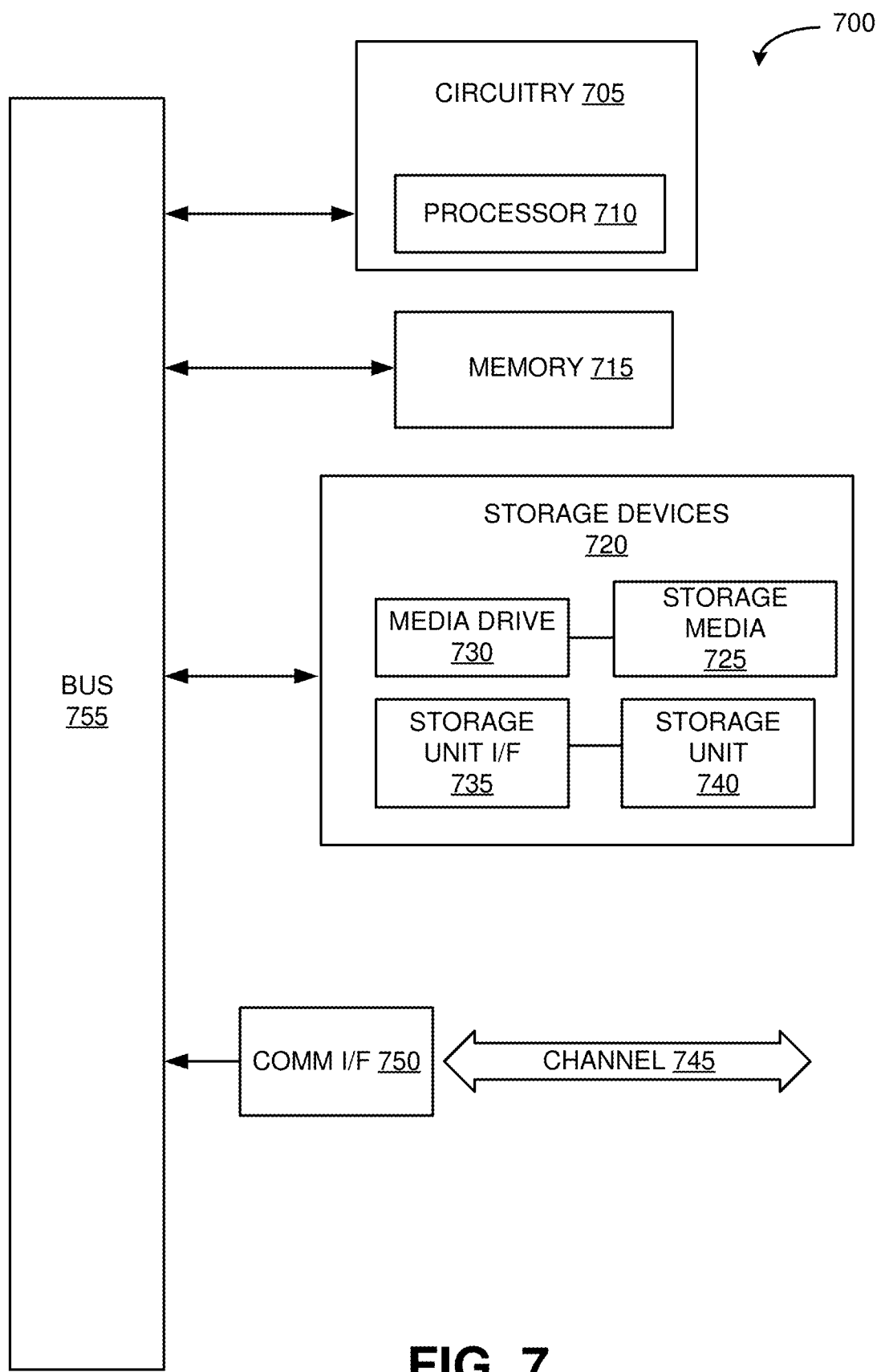
FIG. 7 illustrates example computing component, in accordance with some implementations.

FIG. 7 illustrates example computing component 700, which may in some instances include a processor/controller resident on a computer system (e.g., server system 106). Computing component 700 may be used to implement various features and/or functionality of implementations of the systems, devices, and methods disclosed herein. With regard to the above-described implementations set forth herein in the context of systems, devices, and methods described with reference to FIGS. 1 through 6, including implementations involving server(s) 102, it may be appreciated additional variations and details regarding the functionality of these implementations that may be carried out by computing component 700. In this connection, it will also be appreciated upon studying the present disclosure that features and aspects of the various implementations (e.g., systems) described herein may be implemented with respect to other implementations (e.g., methods) described herein without departing from the spirit of the disclosure.

As used herein, the term component may describe a given unit of functionality that may be performed in accordance with some implementations of the present application. As used herein, a component may be implemented utilizing any form of hardware, software, or a combination thereof. For example, a processor, controller, ASIC, PLA, PAL, CPLD, FPGA, logical component, software routine, or other mechanism may be implemented to make up a component. In implementation, the various components described herein may be implemented as discrete components or the functions and features described may be shared in part or in total among components. In other words, it should be appreciated that after reading this description, the various features and functionality described herein may be implemented in any given application and may be implemented in separate or shared components in various combinations and permutations. Even though various features or elements of functionality may be individually described or claimed as separate components, it will be appreciated that upon studying the present disclosure that these features and functionality may be shared among a common software and hardware element, and such description shall not require or imply that separate hardware or software components are used to implement such features or functionality.

Where components of the application are implemented in whole or in part using software, in implementations, these software elements may be implemented to operate with a computing or processing component capable of carrying out the functionality described with respect thereto. One such example computing component is shown in FIG. 7. Various implementations are described in terms of example computing component 700. After reading this description, it will be appreciated how to implement example configurations described herein using other computing components or architectures.

Referring now to FIG. 7, computing component 700 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 700 is specifically purposed.

Computing component 700 may include, for example, a processor, controller, control component, or other processing device, such as a processor 710, and such as may be included in circuitry 705. Processor 710 may be implemented using a special-purpose processing engine such as, for example, a microprocessor, controller, or other control logic. In the illustrated example, processor 710 is connected to bus 755 by way of circuitry 705, although any communication medium may be used to facilitate interaction with other components of computing component 700 or to communicate externally.

Computing component 700 may also include a memory component, simply referred to herein as main memory 715. For example, random access memory (RAM) or other dynamic memory may be used for storing information and instructions to be executed by processor 710 or circuitry 705. Main memory 715 may also be used for storing temporary variables or other intermediate information during execution of instructions to be executed by processor 710 or circuitry 705. Computing component 700 may likewise include a read only memory (ROM) or other static storage device coupled to bus 755 for storing static information and instructions for processor 710 or circuitry 705.

Computing component 700 may also include various forms of information storage devices 720, which may include, for example, media drive 730 and storage unit interface 735. Media drive 730 may include a drive or other mechanism to support fixed or removable storage media 725. For example, a hard disk drive, a floppy disk drive, a magnetic tape drive, an optical disk drive, a CD or DVD drive (R or RW), or other removable or fixed media drive may be provided. Accordingly, removable storage media 725 may include, for example, a hard disk, a floppy disk, magnetic tape, cartridge, optical disk, a CD or DVD, or other fixed or removable medium that is read by, written to, or accessed by media drive 730. As these examples illustrate, removable storage media 725 may include a computer usable storage medium having stored therein computer software or data.

In alternative implementations, information storage devices 720 may include other similar instrumentalities for allowing computer programs or other instructions or data to be loaded into computing component 700. Such instrumentalities may include, for example, fixed or removable storage unit 740 and storage unit interface 735. Examples of such removable storage units 740 and storage unit interfaces 735 may include a program cartridge and cartridge interface, a removable memory (for example, a flash memory or other removable memory component) and memory slot, a PCMCIA slot and card, and other fixed or removable storage units 740 and storage unit interfaces 735 that allow software and data to be transferred from removable storage unit 740 to computing component 700.

Computing component 700 may also include a communications interface 750. Communications interface 750 may be used to allow software and data to be transferred between computing component 700 and external devices. Examples of communications interface 750 include a modem or softmodem, a network interface (such as an Ethernet, network interface card, WiMedia, IEEE 702.XX, or other interface), a communications port (such as for example, a USB port, IR port, RS232 port Bluetooth® interface, or other port), or other communications interface. Software and data transferred via communications interface 750 may typically be carried on signals, which may be electronic, electromagnetic (which includes optical) or other signals capable of being exchanged by a given communications interface 750. These signals may be provided to/from communications interface 750 via channel 745. Channel 745 may carry signals and may be implemented using a wired or wireless communication medium. Some non-limiting examples of channel 745 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 715, storage unit interface 735, removable storage media 725, and channel 745. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 700 or a processor to perform features or functions of the present application as discussed herein.

Various implementations have been described with reference to specific example features thereof. It will, however, be evident that various modifications and changes may be made thereto without departing from the broader spirit and scope of the various implementations as set forth in the appended claims. The specification and figures are, accordingly, to be regarded in an illustrative rather than a restrictive sense.

Although described above in terms of various example implementations and implementations, it should be understood that the various features, aspects, and functionality described in one of the individual implementations are not limited in their applicability to the particular implementation with which they are described, but instead may be applied, alone or in various combinations, to other implementations of the present application, whether or not such implementations are described and whether or not such features are presented as being a part of a described implementation. Thus, the breadth and scope of the present application should not be limited by any of the above-described example implementations.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," or the like; and adjectives such as "standard," "known," and terms of similar meaning should not be construed as limiting the item described to a given time period or to an item available as of a given time, but instead should be read to encompass standard technologies that may be available or known now or at any time in the future. Likewise, where this document refers to technologies that would be appreciated to one of ordinary skill in the art, such technologies encompass that which would be appreciated by the skilled artisan now or at any time in the future.

The presence of broadening words and phrases such as "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Additionally, the various implementations set forth herein are described in terms of example block diagrams, flow charts, and other illustrations. As will be appreciated after reading this document, the illustrated implementations and their various alternatives may be implemented without confinement to the illustrated examples. For example, block diagrams and their accompanying description should not be construed as mandating a particular architecture or configuration.

What is claimed is:

1. A computer-implemented method for training a depth uncertainty model to generate depth uncertainty values as a function of position in a subsurface volume of interest, the method being implemented in a computer system that comprises a physical computer processor and non-transient storage medium, the method comprising:
    obtaining an initial depth uncertainty model from the non-transient storage medium;
    obtaining training depth uncertainty parameter values from the non-transient storage medium, wherein the training depth uncertainty parameter values are derived from subsurface data, wherein the depth uncertainty parameter values comprise image quality, depth below mud line, subsalt, and overburden complexity;
    obtaining corresponding training depth uncertainty values from the non-transient storage medium, wherein the training depth uncertainty values correspond to the training depth uncertainty parameter values, and wherein a first training depth uncertainty value specifies a first training uncertainty corresponding to a first training depth value;
    generating, with the physical computer processor, a trained depth uncertainty model by training the initial depth uncertainty model using the training depth uncertainty parameter values and the corresponding training depth uncertainty values;
    generating, with the physical computer processor, a representation of depth uncertainty as a function of position in the subsurface volume of interest using a heat map of the subsurface volume of interest to depict at least a portion of the training depth uncertainty values; and
    displaying the representation on the display.

2. The computer-implemented method of claim 1, further comprising:
    obtaining target depth uncertainty parameter values as a function of position in the subsurface volume of interest from the non-transient storage medium, wherein the target depth uncertainty parameter values are derived from subsurface data; and
    generating, with the physical computer processor, target depth uncertainty values as a function of position in the subsurface volume of interest by applying the trained depth uncertainty model to the target depth uncertainty parameter values, wherein a first target depth uncertainty value specifies a first target uncertainty corresponding to a first target depth value.

3. The computer-implemented method of claim 2, wherein the computer system further comprises a display, and wherein the computer-implemented method further comprises:
    generating, with the physical computer processor, a representation of depth uncertainty as a function of position in the subsurface volume of interest using visual effects to depict at least a portion of the target depth uncertainty values; and
    displaying the representation on the display.

4. The computer-implemented method of claim 2, wherein the target depth uncertainty values are based on a lower P10 value and an upper P90 value.

5. The computer-implemented method of claim 1, wherein the training depth uncertainty values comprise synthetic values.

6. The computer-implemented method of claim 1, wherein the depth uncertainty parameter values further comprise dip, well type, closure type, seismic type, and seismic velocity.

7. The computer-implemented method of claim 1, wherein the initial depth uncertainty model and the trained depth uncertainty model comprise one of a regression, a neural network, and a random forest.

8. A computer-implemented method for generating depth uncertainty values as a function of position in a subsurface volume of interest, the method being implemented in a computer system that comprises a physical computer processor, non- transient storage medium, the method comprising:
    generating a trained depth uncertainty model training an initial depth uncertainty model with training depth uncertainty parameter values and training depth uncertainty values, wherein the training depth uncertainty parameter values are derived from subsurface data, wherein the training depth uncertainty values correspond to the training depth uncertainty parameter values, and wherein a first training depth uncertainty value specifies a first training uncertainty corresponding to a first training depth value, wherein the depth uncertainty parameter values comprise image quality, depth below mud line, subsalt, and overburden complexity;
    generating, with the physical computer processor, a representation of depth uncertainty as a function of position in the subsurface volume of interest using a heat map of the subsurface volume of interest to depict at least a portion of the training depth uncertainty values;
    displaying the representation on the display;
    obtaining target depth uncertainty parameter values as a function of position in the subsurface volume of interest from the non-transient storage medium, wherein the target depth uncertainty parameter values are derived from subsurface data; and
    generating, with the physical computer processor, target depth uncertainty values as a function of position in the subsurface volume of interest by applying the trained depth uncertainty model to the target depth uncertainty parameter values, wherein a first target depth uncertainty value specifies a first target uncertainty corresponding to a first target depth value.

9. The computer-implemented method of claim 8, wherein the computer system further comprises a graphical user interface, and wherein the method further comprises:
    generating, with the physical computer processor, a representation of depth uncertainty as a function of position in the subsurface volume of interest using visual effects to depict at least a portion of the target depth uncertainty values; and displaying the representation on the graphical user interface.

10. The computer-implemented method of claim 8, wherein the target depth uncertainty values are based on a lower P10 value and an upper P90 value.

11. The computer-implemented method of claim 8, wherein the training depth uncertainty values comprise synthetic values.

12. The computer-implemented method of claim 8, wherein the depth uncertainty parameter values further comprise dip, well type, closure type, seismic type, and seismic velocity.

13. The computer-implemented method of claim 8, wherein the initial depth uncertainty model and the trained depth uncertainty model comprise one of a regression, a neural network, and a random forest.

14. A system for generating depth uncertainty values as a function of position in a subsurface volume of interest, the system comprising:

electronic storage; and a physical computer processor configured by machine readable instructions to:

generate a trained depth uncertainty model by training an initial depth uncertainty model with training depth uncertainty parameter values and training depth uncertainty values, wherein the training depth uncertainty parameter values are derived from subsurface data, wherein the training depth uncertainty values correspond to the training depth uncertainty parameter values, and wherein a first training depth uncertainty value specifies a first training uncertainty corresponding to a first training depth value, wherein the depth uncertainty parameter values comprise image quality, depth below mud line, subsalt, and overburden complexity;

generating, with the physical computer processor, a representation of depth uncertainty as a function of position in the subsurface volume of interest using a heat map of the subsurface volume of interest to depict at least a portion of the training depth uncertainty values;

displaying the representation on the display;

obtain target depth uncertainty parameter values as a function of position in the subsurface volume of interest from the non-transient storage medium, wherein the target depth uncertainty parameter values are derived from subsurface data; and generate, with the physical computer processor, target depth uncertainty values as a function of position in the subsurface volume of interest by applying the trained depth uncertainty model to the target depth uncertainty parameter values, wherein a first target depth uncertainty value specifies a first target uncertainty corresponding to a first target depth value.

15. The system of claim 14, wherein the system further comprises a display, and wherein the physical computer processor is further configured by machine readable instructions to:

generate, with the physical computer processor, a representation of depth uncertainty as a function of position in the subsurface volume of interest using visual effects to depict at least a portion of the target depth uncertainty values; and display the representation.

16. The system of claim 14, wherein the target depth uncertainty values are based on a lower P10 value and an upper P90 value.

17. The system of claim 14, wherein the training depth uncertainty values comprise synthetic values.

18. The system of claim 14, wherein the depth uncertainty parameter values further comprise dip, well type, closure type, seismic type, and seismic velocity.

19. The system of claim 14, wherein the initial depth uncertainty model and the trained depth uncertainty model comprise one of a regression, a neural network, and a random forest.

20. The system of claim 14, wherein the depth uncertainty values comprise mis-ties.

* * * * *